(12) United States Patent
Goel et al.

(10) Patent No.: US 12,711,315 B2
(45) Date of Patent: Aug. 18, 2026

(54) ARTIFICIAL INTELLIGENCE MESSAGE SANITIZATION

(71) Applicant: Wald Inc., Palo Alto, CA (US)

(72) Inventors: Vinay Goel, Palo Alto, CA (US); Ritesh Ahuja, Cupertino, CA (US); Harish Gudelly, Hyderabad (IN); Abhishek Chugh, Bengaluru (IN)

(73) Assignee: Wald Inc., Palo Alto, CA (US)

( * ) Notice: Subject to any disclaimer, the term of this patent is extended or adjusted under 35 U.S.C. 154(b) by 156 days.

(21) Appl. No.: 18/771,394

(22) Filed: Jul. 12, 2024

(65) Prior Publication Data

US 2026/0017462 A1 Jan. 15, 2026

(51) Int. Cl.

| | |
|---|---|
| ***G06F 21/60*** | (2013.01) |
| ***G06F 40/166*** | (2020.01) |
| ***G06F 40/289*** | (2020.01) |
| ***G06F 40/35*** | (2020.01) |

(52) U.S. Cl.
CPC ............ *G06F 40/35* (2020.01); *G06F 40/166* (2020.01); *G06F 40/289* (2020.01)

(58) Field of Classification Search
CPC .. G06F 21/60; G06F 21/6254; G06F 16/3329; G10L 15/22
See application file for complete search history.

(56) References Cited

U.S. PATENT DOCUMENTS

| | | | |
|---|---|---|---|
| 10,706,841 B2 | 7/2020 | Gruber et al. | |
| 10,943,072 B1 | 3/2021 | Jaganmohan | |
| 11,893,358 B1 | 2/2024 | Lakshmikantha et al. | |
| 12,556,533 B1 * | 2/2026 | Gu | H04L 63/083 |
| 2023/0325610 A1 | 10/2023 | Peleg et al. | |
| 2023/0342559 A1 | 10/2023 | Bhardwaj et al. | |
| 2023/0351102 A1 | 11/2023 | Tran | |
| 2025/0068764 A1 * | 2/2025 | Joshi | G06F 40/20 |
| 2025/0103746 A1 * | 3/2025 | Gharibi | G06F 21/6227 |
| 2025/0131121 A1 * | 4/2025 | Teng | G10L 15/30 |

(Continued)

OTHER PUBLICATIONS

Arstechnica.com [online], "DuckDuckGo offers "anonymous" access to AI chatbots through new service," Jun. 6, 2024, retrieved on Jun. 7, 2024, retrieved from URL <https://arstechnica.com/information-technology/2024/06/duckduckgo-offers-anonymous-access-to-ai-chatbots-through-new-service/>, 7 pages.

*Primary Examiner* — Daniel Abebe
(74) *Attorney, Agent, or Firm* — FISH & RICHARDSON P C.

(57) ABSTRACT

Methods, systems, and apparatus, including computer programs encoded on computer storage media, for sanitizing artificial intelligence prompts. One of the methods includes receiving a message a) for an external system and b) that comprises two or more phrases; for at least one phrase from the two or more phrases: determining a context of the phrase in the message; determining, using the context, whether modification of the phrase will likely maintain an intent of the message; determining whether to permit unedited transmission of the message to the external system using a result of at least one of one or more determinations whether modification of the phrase will likely maintain the intent of the message; and performing one or more actions using a result of the determination whether to permit unedited transmission of the message to the external system.

23 Claims, 5 Drawing Sheets

(56) References Cited

U.S. PATENT DOCUMENTS

2025/0150474 A1* 5/2025 Jones ...................... G06F 21/60
2025/0165648 A1* 5/2025 Gomez ............... G06F 21/6254
2025/0238627 A1* 7/2025 Carrillo .................. G06F 40/40

* cited by examiner

ARTIFICIAL INTELLIGENCE MESSAGE SANITIZATION

BACKGROUND

Generative artificial intelligence ("GAI") is a type of artificial intelligence that can generate data, such as text or images. People are turning to GAI for everyday tasks like writing emails, drafting memos and presentations, analyzing documents, and even writing code. When people used client devices to interact with a GAI system, such as using a prompt as an input request to a large language model ("LLM"), the information given by the person in the request can be used to train the LLM.

SUMMARY

In general, one aspect of the subject matter described in this specification can be embodied in methods that include the actions of receiving a message a) for an external system and b) that comprises two or more phrases; for at least one phrase from the two or more phrases: determining a context of the phrase in the message; determining, using the context, whether modification of the phrase will likely maintain an intent of the message; determining whether to permit unedited transmission of the message to the external system using a result of at least one of one or more determinations whether modification of the phrase will likely maintain the intent of the message; and performing one or more actions using a result of the determination whether to permit unedited transmission of the message to the external system.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination.

In some implementations, determining whether to permit unedited transmission of the message to the external system can include determining whether to generate a second message for the external system using a result of at least one of one or more determinations whether modification of the phrase will likely maintain the intent of the message. Performing one or more actions can use a result of the determination whether to generate the second message for the external system.

In some implementations, performing the one or more actions can include: generating a second message for the external system using the result of the determination whether to generate a second message for the external system; providing, to the external system, the second message; receiving, from the external system, a response; determining whether to update the response using the first result of the determination whether modification of the phrase will likely maintain the intent of the message; and providing instructions that cause presentation of data for the response using a second result of the determination whether to update the response using the result of the determination whether modification of the phrase will likely maintain the intent of the message.

In some implementations, determining whether to generate a second message for the external system can include: determining whether the message can likely be sanitized; selecting, from a group comprising a local generative artificial intelligence system and at least one external generative artificial intelligence system, a generative artificial intelligence system, the local generative artificial intelligence system not being provided sanitized messages; and in response to selecting the generative artificial intelligence system, providing the second message to the generative artificial intelligence system.

In some implementations, the method can include determining, for a phrase from the two or more phrases and using the context, that modification of the phrase will likely maintain an intent of the message; generating the second message by replacing one or more instances of the phrase with a replacement phrase; updating the response by replacing instances of the replacement phrase with the phrase; and providing instructions that cause presentation of the response that includes the phrase instead of the replacement phrase.

In some implementations, determining whether modification of the phrase will likely maintain the intent of the message can include determining, using the context, whether modification of the phrase will likely maintain the intent of the message and to skip providing all phrases from the original prompt to the external system.

In some implementations, generating the second message for the external system using the result of the determination whether modification of the phrase will likely maintain the intent of the message can include: in response to determining that modification of the phrase will likely maintain the intent of the message, providing, to a sanitization model, the phrase as input; in response to providing the phrase as input, receiving, from the sanitization model, a replacement phrase for the phrase that does not include sensitive data; and generating, using the context, the second message that replaces at least some instances of the phrase with the replacement phrase.

In some implementations, providing the phrase as input can include providing, as input to the sanitization model, the phrase, a sensitivity score for the phrase, and an importance score for the phrase.

In some implementations, generating the second message can include: for each instance of the phrase in the message: determining a corresponding meaning of the phrase; and determining whether to replace the instance of the phrase in the message using the corresponding meaning.

In some implementations, the method can include determining, for at least one instance of the phrase, to replace the instance of the phrase in the message using the corresponding meaning.

In some implementations, the method can include determining, for at least one instance of the phrase, to skip replacing the instance of the phrase in the message using the corresponding meaning.

In some implementations, determining, for the at least one phrase from the two or more phrases, whether modification of the phrase will likely maintain the intent of the message can include: determining, using a domain classification model that receives the message as input, a domain for the phrase; determining, using a domain specific model for the domain that receives the message as input, whether the phrase satisfies one or more sensitivity criteria for the domain; and determining whether modification of the phrase will likely maintain the intent of the message using the context and a third result of the determination whether the phrase satisfies one or more sensitivity criteria for the domain.

In some implementations, the one or more sensitivity criteria can include one or more of a first sensitive content criterion or a second sensitive intent criterion.

In some implementations, the method can include, for the at least one phrase from the two or more phrases: determining, using the context, an importance of the phrase in the message. Determining whether modification of the phrase will likely maintain the intent of the phrase can use the context, the importance of the phrase in the message and the third result of the determination whether the phrase satisfies one or more sensitivity criteria for the domain.

In some implementations, determining the importance of the phrase in the message can include determining, using the context, an importance score that represents the importance of the phrase in the message. Determining whether the phrase satisfies one or more sensitivity criteria for the domain can include determining, using the domain specific model for the domain, a sensitivity score that indicates whether the phrase satisfies one or more sensitivity criteria for the domain. Determining whether modification of the phrase will likely maintain the intent of the phrase can use the importance score and the sensitivity score.

In some implementations, the method can include, for the at least one phrase from the two or more phrases: determining, using the context, an importance of the phrase in the message. Determining whether modification of the phrase will likely maintain the intent of the phrase can use the context and the importance of the phrase in the message.

In some implementations, the method can include determining, using the phrase, whether the phrase should be analyzed using a sanitization process and the phrase likely includes sensitive data. Determining the context for the phrase in the message can be responsive to determining that the phrase should be analyzed using the sanitization process.

In some implementations, the method can include predicting the intent of the message.

In some implementations, performing the one or more actions can include blocking transmission of the message to the external system.

In some implementations, performing the one or more actions can include blocking transmission of any data for the message to the external system.

In some implementations, the message can be at least one of a prompt, an email, or a text message.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

The subject matter described in this specification can be implemented in various implementations and may result in one or more of the following advantages. In some implementations, the systems and methods described in this specification can provide more accurate responses to prompts, compared to other systems, by selectively replacing phrases with replacement phrases using a context, an intent, or both of the prompt. In some implementations, the systems and methods described in this specification can increase data security, compared to other systems, by selectively replacing phrases in a prompt with replacement phrases before providing the sanitized prompt to a generative AI system for analysis. In some implementations, the systems and methods described in this specification can increase data security, provide more accurate responses, or both, by determining, using a context of a prompt, whether modification of the phrase will likely maintain an intent of the prompt, compared to other systems. The more accurate responses can include reducing false positives for prompts that are sanitized at least in part, compared to other systems. The more accurate responses can include responses that are more likely responsive to an original prompt. In some implementations, the systems and methods described in this specification can provide increased flexibility, response accuracy, or both, by using a sanitization system that determines to which of multiple generative AI systems to send a prompt, whether sanitized or otherwise.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
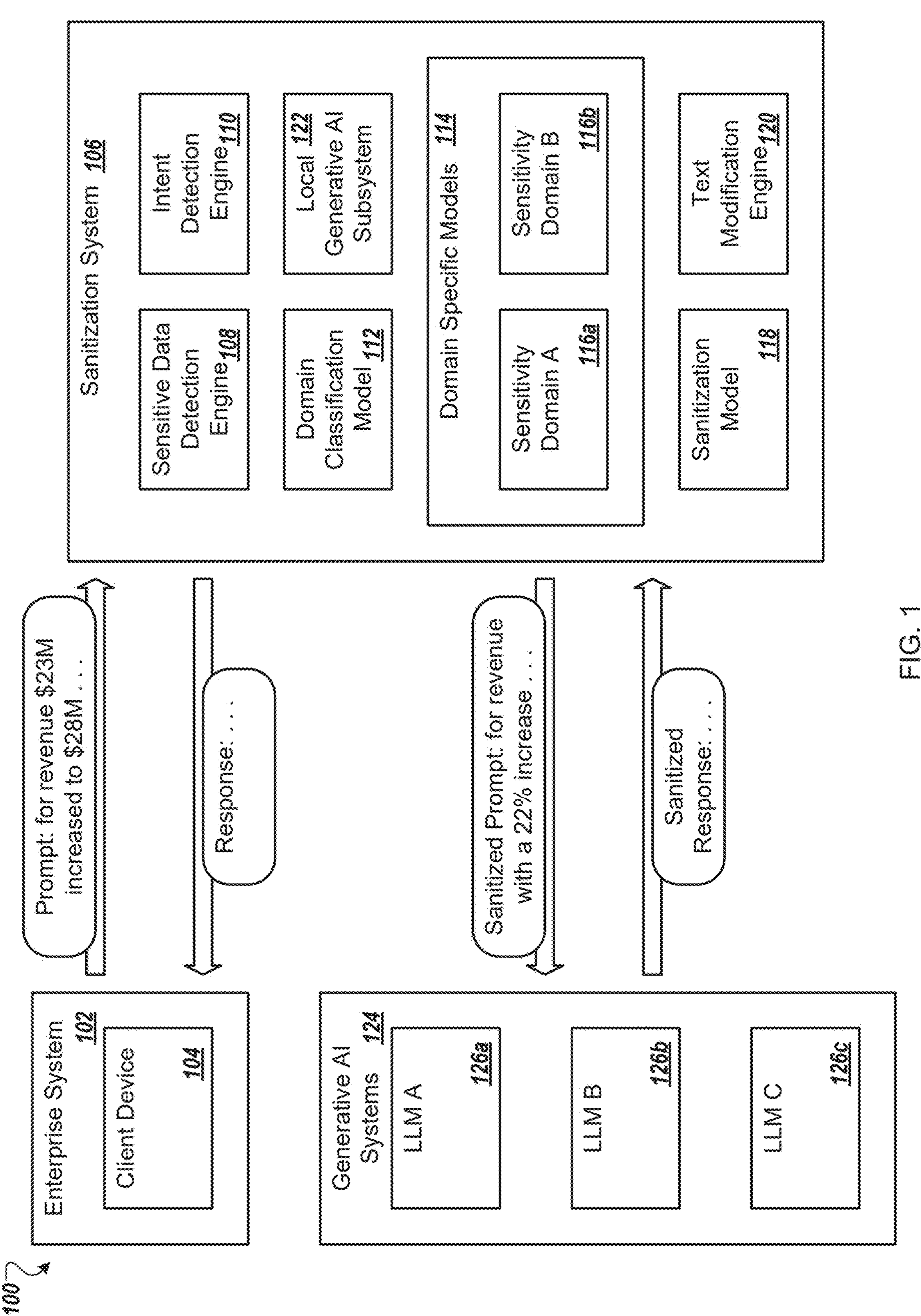
FIG. 1 depicts an example environment in which a sanitization system determines whether to sanitize a prompt for an enterprise system before processing by one or more generative AI systems.

Various devices can provide prompts to generative artificial intelligence ("GAI") systems. When the devices are employee devices, the devices might inadvertently provide confidential or other types of sensitive information as part of a prompt. For instance, a device can use a GAI system to write an email, draft a memo or a presentation, write code, or analyze a document. Some examples of other types of sensitive information can include customer or employee data, personally identifiable information, or company secrets. Provision of this sensitive data might allow a recipient GAI system to retrain using that sensitive data, a malicious actor to access that sensitive data, or both.

To increase the security of the sensitive data, a sanitization system can analyze a prompt before a prompt is forwarded to a GAI system. The sanitization system can determine an intent of a prompt, context for one or more phrases included in the prompt, e.g., given the intent, or both. The sanitization system can use the context of a phrase to determine whether the phrase should be removed from the prompt, replaced with a generic phrase, or left in the prompt without modification to reduce a likelihood of sensitive data being provided to the GAI system. For instance, given the prompt "What is John Doe's height?" the sanitization system can determine to leave the prompt unchanged as any changes to the prompt would lose the intent of the prompt. In contrast, for the prompt "John Doe is 63, has symptoms A, B, and C. What is his diagnosis?", the sanitization system can determine to replace or redact the phrase "John Doe" and optionally the age "63" as the intent of the prompt will likely remain unchanged without the person's name. In some examples, the specific age can be replaced with a general age, e.g., "early sixties".

When the sanitization system provides the modified prompt to the GAI system, to the extent that the GAI system might store the prompt in a database or use the prompt in a retraining process, the removal or replacement of the sensitive data from the prompt can reduce a likelihood of misuse of sensitive data. The sanitization system can receive a response back from the GAI system and reinsert any necessary sensitive data for presentation of the response on a display, e.g., to the user who entered the prompt initially.

The sanitization system can include any appropriate number of domain specific models when determining whether and how to modify a prompt. At least some, e.g., all, of the domain specific models can determine whether phrases satisfy one or more sensitivity criteria. In some examples, there can generally be three types of sensitive data, with different levels of sensitivity. Each of these three types of sensitive data can relate to a potential leak of confidential information to an external generative AI system, e.g., LLM, if included in an un-sanitized prompt provided to the external generative AI system.

One type of sensitive data can include highly sensitive data. This can include personally identifiable information. The sanitization system can determine that highly sensitive data should generally be mostly redacted, e.g., unless there is some information that is necessary or important to preserve the intent of the prompt. Although some other systems can use expression matching solutions, e.g., regular expression matching, these systems will redact all phrases categorized as highly sensitive data irrespective of whether the actual use of the phrase is highly sensitive and might even be public information, e.g., John Doe's name. When the sanitization system determines a context of a phrase in a prompt, the sanitization system is more accurate than these other systems by retaining the intent of the prompt and, e.g., only substituting this type of data when the prompt's intent will be retained. For instance, if a prompt includes a particular age, e.g., 63, the sanitization system can generate a replacement phrase that generalizes that age, e.g., "in their sixties" or "over sixty" depending on the context of the phrase.

One type of sensitive data can include moderately sensitive data. Moderately sensitive data can include trade secrets, e.g., customer data, product launch plans, and internal team plans, to name a few examples. By using a context of a prompt, the sanitization system can detect this type of sensitive data that might not otherwise be detectable. For instance, the sanitization system can go much deeper in understanding the complete context of the prompt and redact, replace, or a combination of both, phrases in the prompt to maintain context.

One type of sensitive data can include less sensitive data. Less sensitive data can include general inquiries, research queries, standard internal email drafts, or other appropriate types of data. The sanitization system can more accurately process prompts that include less sensitive data using an intent of the prompt. For instance, although the less sensitive data might not itself be sensitive, the context within which the prompt is used and the intent of the prompt might indicate a sensitive context for the prompt. As a result, the sanitization system can determine to modify the prompt to reduce a risk of less sensitive data loss. For example, the sanitization system can determine whether there is any sensitive intent for the prompt. If so, the sanitization system can attempt to reword or rephrase the prompt so that context of the prompt is maintained.

FIG. 1 depicts an example environment 100 in which a sanitization system 106 determines whether to sanitize a prompt for an enterprise system 102 before processing by one or more generative AI systems 124. The sanitization system 106 receives a prompt from a client device 104 that is part of the enterprise system 102. Since the prompt can include data that is sensitive to the enterprise system 102, e.g., from a network security or confidentiality standpoint, the sanitization system 106 processes the prompt to remove any potentially sensitive data before sending a sanitized prompt, e.g., as part of a message, to the one or more generative AI systems 124.

The enterprise system 102 can be any appropriate type of system for an entity, such as a company or a government. Given the types of data used by the enterprise system 102 it would be virtually impossible for the enterprise system 102 to define rules for every data type, data context, or both, in which data is likely sensitive, whether confidential or otherwise.

The enterprise system 102 can include any appropriate number, types, or both, of devices. The enterprise system 102 is shown with a single client device 104. Other examples can include any appropriate number of client devices 104 that can generate and transmit prompts to the sanitization system 106.

The prompt can be any appropriate type of prompt. For instance, the prompt can be a request for generation of an email related to a revenue increase from $23 million to $28 million, a request for a person's height, or a request for how to improve the network security of the enterprise system.

The sanitization system 106 receives the prompt from the enterprise system 102, e.g., the client device 104. The sanitization system 106 can determine the entity to which the prompt relates. For instance, since the sanitization system 106 receives prompts for multiple different enterprise systems, e.g., hundreds or thousands of enterprise systems, the sanitization system 106 can determine the enterprise system 102 from the multiple different enterprise systems to which the prompt relates. Since different phrases can have a different meaning for different enterprises, determination of the correct enterprise for the prompt can improve the accuracy of data processing for the prompt.

The sanitization system 106 can remove identifying information from the prompt. For instance, the sanitization system 106 can remove information from the prompt that might identify the enterprise system 102, the client device 104, a person using the client device 104, or a combination of two or more of these, e.g., all of these. The removal of this identification information can be similar to placing a device, e.g., the client device 104, in incognito mode. As a result, even if some sensitive information is captured by one of the generative AI systems 124, and that sensitive information somehow leaks, the sensitive information cannot be traced back to the enterprise system 102, the person, or both.

The sanitization system can perform one or more processes to remove identifying information from the prompt.

For example, the sanitization system 106 can mask an identity of the enterprise system 102, e.g., the entity that maintains the enterprise system 102, the person, or both. The sanitization system 106 can use its own application programming interface key for the generative AI systems 124, e.g., a respective one of the LLMs A-C 126*a-c*, in a stateless manner. The sanitization system 106 can hide an IP address for the prompt, e.g., a source IP address of the client device 104 from which the prompt originated or other intermediary devices, with the sanitization system acting as a proxy in the middle of communications between devices in the enterprise system 102 and the generative AI systems 124. In some examples, the sanitization system 106 can encrypt data for a session with the client device 104, e.g., a chat history, using end-to-end encryption, an encryption key for the respective device, e.g., the client device 104, or both. The client device 104 can maintain an encryption key for the session, e.g., preventing access to unencrypted data for the session by the sanitization system 106 or another system. This can reduce a likelihood that an employee of the sanitization system 106, a malicious actor, or another person can access data that indicates the prompts received for corresponding enterprise systems 102.

A sensitive data detection engine 108, included in the sanitization system 106, determines whether the prompt might include one or more phrases that satisfy a sensitivity criterion. For instance, the sensitive data detection engine 108 can use a model, a database, or a combination of both, to determine whether a phrase in the prompt might satisfy the sensitivity criterion. The model, the database, or both, can be specific to the determined entity, a type of entity, or a combination of both. In some examples, the model, the database, or both, can be entity agnostic.

The sensitive data detection engine 108 can be any appropriate type of model, e.g., machine learning model. For instance, the sensitive data detection engine 108 can be a large language model ("LLM") trained to determine whether a prompt potentially includes sensitive data.

The sensitive data detection engine 108 can use any appropriate type of data when making its determination. For example, the sensitive data detection engine 108 uses the prompt as input and can optionally use a context for the prompt, a context for a phrase in the prompt, an intent for the prompt, or a combination of two or more of these, when determining whether the prompt might include one or more phrases that satisfy a sensitivity criterion.

When the sensitive data detection engine 108 determines that the prompt likely does not include any phrases that satisfy the sensitivity criterion, or any criterion from multiple sensitivity criteria, the sanitization system 106 determines to skip modification of the prompt. For instance, the sensitive data detection engine 108 can receive a prompt "what is tomorrow's weather?" The sensitive data detection engine 108 can determine that this prompt likely does not include any sensitive data, e.g., for the entity or otherwise, and the sanitization system 106 can provide an unmodified version of the prompt to the generative AI systems 124. The sanitization system 106 can select one of the large language models ("LLMs") A-C 126*a-c* from the generative AI systems 124 to which to provide the prompt "what is tomorrow's weather?"

When the sensitive data detection engine 108 determines that the prompt likely includes any phrase that satisfies the sensitivity criterion, or any criterion from multiple sensitivity criteria, the sanitization system 106 determines whether to modify the prompt. For example, the sensitive data detection engine 108 can determine that the prompt is "what is John Doe's height." Since the prompt includes the name, "John Doe," the sensitive data detection engine 108 itself has insufficient functionality to determine whether and how to process the prompt and that additional processing by other, e.g., more robust, components of the sanitization system 106 is necessary.

An intent detection engine 110 analyzes the prompt to determine a likely intent for the prompt. For instance, the intent detection engine 110 is a model that analyzes the phrases included in the prompt to determine the intent of the prompt. The intent detection engine 110 can be any appropriate type of model, e.g., machine learning model such as an LLM. The intent detection engine 110 uses the prompt as input and optionally contextual data for the prompt. For instance, when the sanitization system 106 receives the prompt as one of multiple messages from the client device 104 as part of a network session, the intent detection engine 110 can use data from the network session as contextual data input. The contextual data input can include other prompts from the network session, other appropriate types of data from the network session, or both. For example, with the prompt "What is John Doe's height," the intent can be to determine a person's height.

The sanitization system 106 includes a domain classification model 112. The domain classification model 112 determines, for one or more phrases from the prompt, a domain to which the phrase corresponds. The phrases can be candidate sensitive phrases or any phrase from the prompt, e.g., when the sanitization system 106 has not determined whether any particular phrase might be sensitive. When the sanitization system 106 determines that the candidate phrase is likely sensitive, the sanitization system 106 can determine to redact, rephrase, or a combination of both, the sensitive information. In some examples, the sanitization system 106 can use the domain classification model 112, as described in more detail below, for at least part of the redaction and rephrasing processes.

The phrases can be any appropriate combinations of words from the prompt. For instance, the sanitization system 106, e.g., the domain classification model 112, can determine the one or more phrases. The phrases can be candidate sensitive phrases for which the sanitization system 106 is determining whether the phase might satisfy one of multiple sensitive data criteria. Given the example prompt of "What is John Doe's height?", the phrases can be "John Doe" and "height" when the phrase "what is" includes only words that will never be sensitive.

The domain classification model 112 can determine multiple domains for a single prompt, a single phrase, or both. For example, the sanitization system 106 maintains data for one or more domain specific models 114. Each of the domain specific models 114 can be trained to detect whether a phrase included in a prompt satisfies one or more sensitivity criteria for the corresponding domain given the context of the phrase in the prompt. By using multiple different domain specific models 114, the sanitization system 106 can more accurately process data for different domains. For the phrase "height", the domain classification model 112 can determine that the phrase applies to the domain's potential personal information and medical information. As a result, the domain classification model 112 can select a personal information sensitivity domain model A 116*a* and a medical information sensitivity model B 116*b* for processing the prompt given the phrase height.

The domain specific models 114, e.g., in conjunction with a sanitization model 118, can determine whether a phrase satisfies one or more sensitivity criteria. The sensitivity criteria can include whether the phrase itself is sensitive content. For instance, the name of the entity that maintains the enterprise system 102, such as "Brand A", or the name of a secret project for the enterprise system 102 that is confidential and has not been released to the public are two examples of phrases that are potentially sensitive content.

The sensitivity criteria can include whether the phrase is used with sensitive intent. For example, the phrase "My colleague is harassing me. How should I report it to HR?" does not contain any company confidential data but can be harmful to the company, employees at the company, or both, if leaked. As a result, the domain specific models 114 can determine whether the intent of the prompt is likely sensitive and the prompt should be reworded to maintain the primary intent of the prompt, e.g., "How should an employee report harassment in the workplace?"

The domain specific models 114 can generate output that indicates a likelihood that a corresponding phrase satisfies one or more sensitivity criteria. For instance, the sensitivity domain A-B models 116*a-b*, as examples of domain specific models 114 for the domains A-B, can receive, as input, the prompt, contextual information for the prompt, an identifier for a phrase in the prompt that belongs to the corresponding domain, or a combination of two or more of these. The contextual information for the prompt can include data from the network session during which the prompt was received, e.g., other prompts or other types of data from that session.

In some examples, a phrase can satisfy the sensitive criteria in some contexts but not others. For instance, the phrase "John Doe" can be a type of sensitive data. In a first prompt, "What is John Doe's height?", the phrase is not sensitive because the first prompt does not include any confidential or other types of sensitive information about John Doe and does not include the use of John Doe's name in a sensitive context. For a second prompt "John Doe is 63, has symptoms A, B, and C. What is his diagnosis?", the phrase "John Doe" is sensitive because the context in which the phrase is used includes medical details about John Doc. As a result, at least one of the domain specific models 114 would determine that the phrase John Doe is sensitive for the second prompt and should be sanitized.

The sanitization model 118 receives output from the multiple domain specific models 114, e.g., the sensitivity domain models A-B 116*a-b*, and determines whether the prompt can be modified, e.g., while maintaining the intent of the prompt. For instance, the sanitization model 118 receives the outputs from the various sensitivity domain models A-B 116*a-b* and determines, for each phrase that satisfies a sensitivity criteria for the corresponding domain, whether modification of the phrase will likely maintain the intent of the prompt. For the prompt "John Doe is 63, has symptoms A, B, and C. What is his diagnosis?", the sanitization model 118 can determine whether removal of the phrase "John Doe" from the prompt will maintain the intent of the phrase.

The sanitization model 118 can use any appropriate process to determine whether modification of a prompt will likely maintain the intent of the prompt. For instance, the sanitization model 118 can use one or more scores to determine whether modification of a prompt will likely maintain the intent of the prompt.

The sanitization model 118 can use an importance score that indicates a likely importance of a phrase in the prompt. The sanitization system 106 can include an importance detection model that determines the importance score of a phrase, e.g., that represents an entity, detected in the prompt. The importance score for a phrase can indicate whether removing that phrase from the prompt, e.g., and adding one or more replacement phrases, will likely change the intent of the prompt, e.g., render the prompt less meaningful or useless, the meaning of the phrase, or both.

The sanitization model 118 can use one or more criteria, represented by the model itself, for the importance score. A phrase for which a corresponding importance score satisfies the one or more criteria can be a phrase that should not be replaced with a replacement phrase to maintain the intent of the prompt, the context of the phrase within the prompt, or both.

The sanitization model 118 can use a sensitivity score for a phrase. A sensitivity score for a phrase can indicate the degree to which the phrase is likely sensitive, e.g., for the enterprise system 102 for which the phrase was included in a prompt. A phrase that likely has a higher sensitivity is more likely to need to be replaced in the prompt than a phrase that likely has a lower sensitivity, e.g., for the enterprise system 102.

The sanitization model 118 can use, for a phrase, the corresponding importance score and sensitivity score when determining whether modification of the phrase in the prompt will change an intent of the prompt. For instance, when the sensitivity score is low, e.g., does not satisfy a sensitivity score threshold, the sanitization model 118 might not modify the phrase, e.g., redact the phrase from the prompt. When the importance score is low, e.g., does not satisfy an importance score threshold, the sanitization model 118 can modify the phrase in the prompt with a lower likelihood of changing the intent of the prompt. When both scores are higher, e.g., and satisfy the corresponding score thresholds, the sanitization model 118 might determine that modification of the prompt will not likely be possible without modifying the intent of the prompt and that modifying the prompt should be skipped.

In some examples, when both the importance score and the sensitivity score satisfy corresponding score thresholds, the sanitization model 118 can experimentally modify the prompt to determine whether the intent of the prompt has likely changed. For instance, the sanitization system 106 can use a text modification engine 120 to generate replacements for phrases in the prompt. When a sensitivity score for a phrase satisfies the sensitivity score threshold while the importance score for the phrase does not satisfy the importance score threshold, e.g., for the phrase "John Doe" in the second prompt of "John Doe is 63, has symptoms A, B, and C. What is his diagnosis?", the text modification engine 120 can generate a replacement phrase, e.g., "[Patient A]", for the second prompt.

For instances in which both thresholds are satisfied, e.g., both scores are high, the sanitization system 106 can use the text modification engine 120, e.g., and the intent detection engine 110, to determine whether replacement of a phrase will likely change an intent. For instance, the text modification engine 120 can generate a replacement phrase for a prompt, creating a sanitized prompt. In the example shown in FIG. 1, for a request to generate an email related to a revenue increase, the replacement phrase can be "with a 22% revenue increase" for an initial phrase of "revenue $23M increased to $28M". The intent detection engine 110 can determine the intent for the sanitized prompt. If the intent of the original prompt satisfies a similarity criterion with the sanitized prompt, the sanitization system 106 can determine to use the sanitized prompt.

In some implementations, the sanitization system 106 can use a local generative AI subsystem 122 to determine whether the intent of the prompt is likely maintained. For instance, the local generative AI subsystem 122 can be a privately deployed LLM model, e.g., open source LLM model, that is part of the sanitization system 106. The local generative AI subsystem 122 can receive, as separate inputs, the prompt and the sanitized prompt. The local generative AI subsystem 122 can generate two outputs, one for each of the prompts. In some examples, the local generative AI subsystem 122 can be more secure, less robust, smaller, have fewer parameters, a controlled system, provided un-sanitized prompts, or a combination of these, compared to the systems included in the generative AI systems 124. In some examples, the local generative AI subsystem does not have data retention, retraining, or both, using data from the prompts received from various client devices.

The sanitization system 106 can determine a similarity of the outputs of the two prompts. If the outputs satisfy an output similarity criterion, the sanitization system 160 can determine that the replacement of the phrase in the sanitized prompt likely did not change the intent of the prompt and to provide the sanitized prompt to one or more of the generative AI systems 124. For example, if the outputs from the local generative AI subsystem 122 are substantially similar, the sanitization system 106 can determine that the replacement of the phrase in the sanitized prompt will not likely affect a response from any of the generative AI systems 124, e.g., public generative AI systems 124.

Figure 2A:
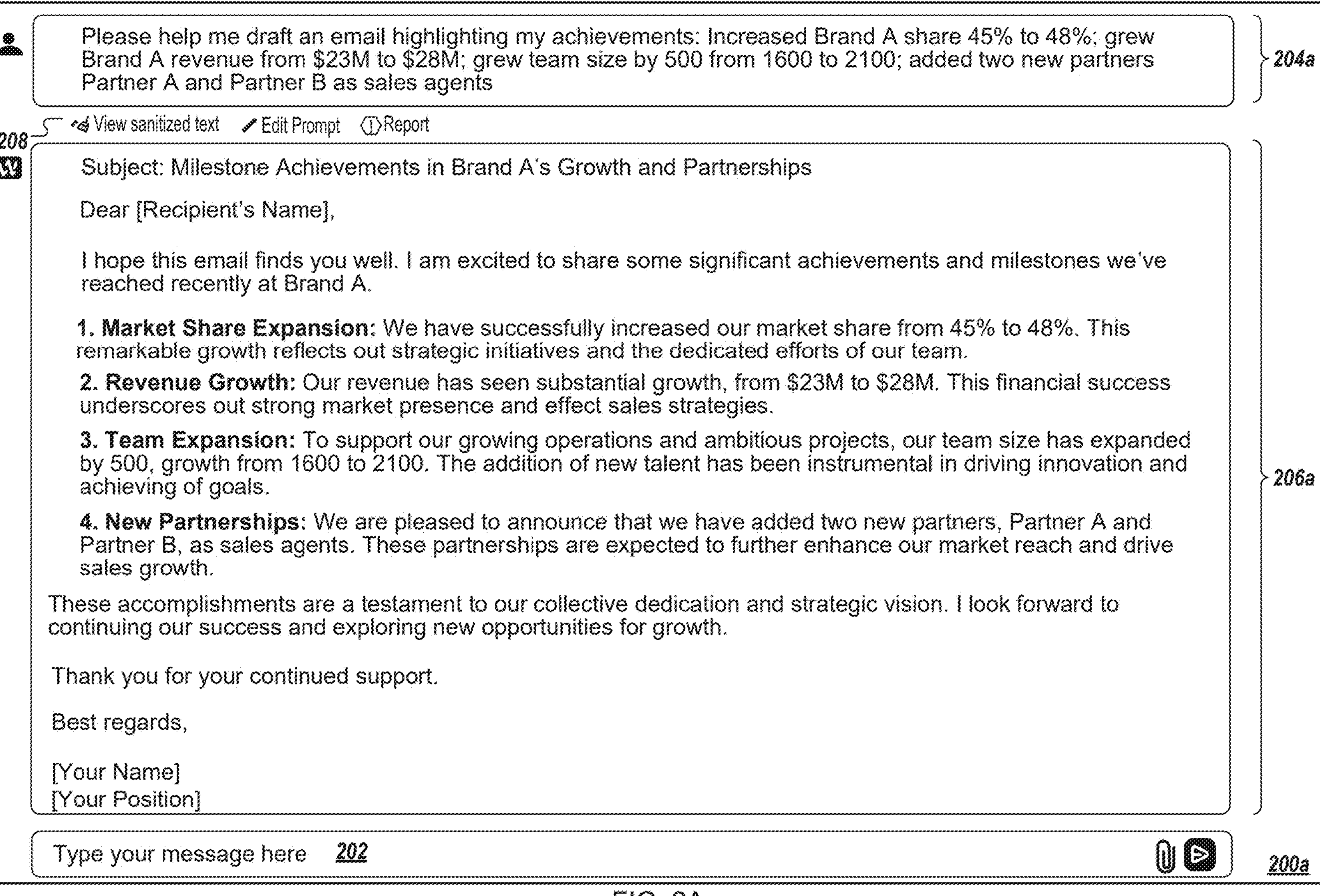
FIGS. 2A-B depict example user interfaces.
Figure 2B:
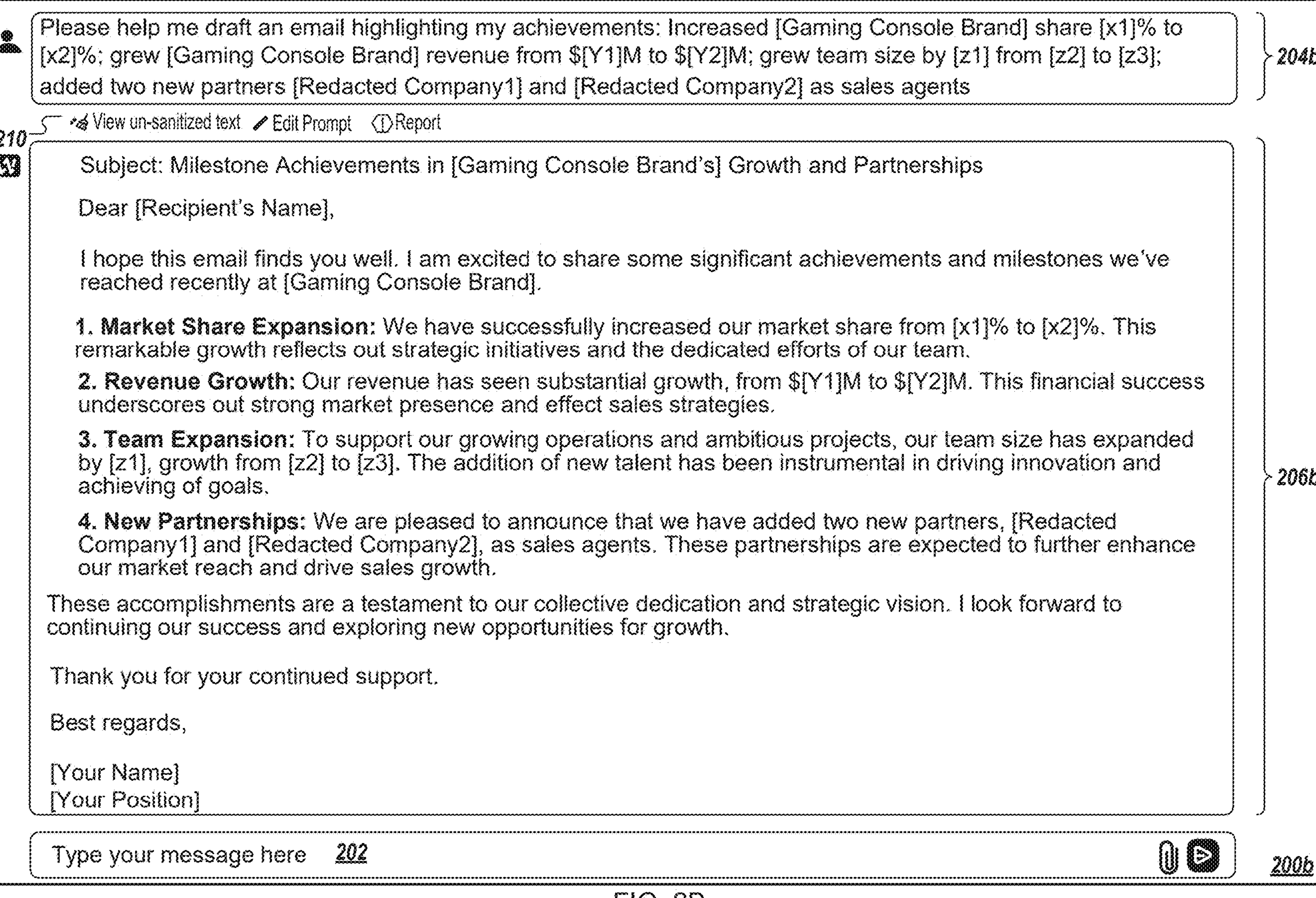

FIGS. 2A-B depict example user interfaces 200*a-b*. The user interfaces 200*a-b* can be presented on a client device, e.g., the client device 104. In some examples, the user interface 200*b* is not presented on a client device but shows an example of sanitized data for a prompt.

As shown in FIG. 2A, the user interface 200*a* includes a prompt entry field 202. When presented by a client device, the prompt entry field 202 can receive input defining a prompt, e.g., the request for drafting an email.

The user interface 200*a* includes session history information 204*a*-206*a*. For instance, the user interface 200*a* can depict a previously entered prompt 204*a* and a response 206*a* to that prompt.

The user interface 200*a* can include one or more user interface elements, such as a "view sanitized text" user interface element 208. Selection of the "view sanitized text" user interface element 208 can cause presentation of at least a portion of the user interface 200*b* shown in FIG. 2B. For instance, selection of the "view sanitized text" user interface element 208 can cause presentation of a sanitized prompt 204*b*.

The sanitized prompt 204*b* includes one or more phrase replacements generated by the text modification engine 120. In this example, the text modification engine 120 changed the name of the entity for the enterprise system 102 from "Brand A" to "[Gaming Console Brand]" to anonymize the entity's name. The text modification engine 120 changed the market share numbers that were included in the prompt from 45% and 48% to "[x1]%" and "[x2]%", respectively. Similarly, the text modification engine 120 sanitized the revenue and team size numbers, and the names of two partners that were included in the original prompt. In this example, the replacement phrases are included in square brackets, "[" and "]".

Returning to FIG. 1, the sanitization system 106 sends the sanitized prompt to one of the generative AI systems 124. For example, the sanitization system 106 can select one of the LLMs A-C 126*a-c* from the generative AI systems 124 to which the sanitized prompt should be sent. The sanitization system 106 can receive, in response, a sanitized response from the selected LLM.

The user interface 200*b* in FIG. 2B depicts an example of a sanitized response 206*b*. Since the sanitized prompt 204*b* included replacement phrases for potentially sensitive phrases, the sanitized response 206*b* similarly includes the replacement phrases along with other content for the sanitized response 206*b*.

When presenting the user interface 200*b* with the sanitized prompt 204*b*, the sanitized response 206*b*, or both, the user interface 200*b* can include one or more user interface elements. Each of the user interface elements can be for respective content in the user interface 200*b*. For example, although not shown in FIG. 2B, the user interface 200*b* can include one set of the user interface elements for the prompt 204 and another set of user interface elements for the response.

As shown in the user interface 200*b*, one of the user interface elements can be a "view un-sanitized text" user interface element 210. Upon detecting selection of the "view un-sanitized text" user interface element 210 for the prompt, the user interface 200 can switch from presenting the sanitized prompt 204*b* to presenting the un-sanitized, e.g., original, prompt 204*a*. Upon detecting selection of the "view un-sanitized text" user interface element 210 for the response, the user interface 200 can switch from presenting the sanitized response 206*b* to presenting the un-sanitized response 206*a*, shown in FIG. 2A.

Returning to FIG. 1, the text modification engine 120 can generate the un-sanitized response from the sanitized response. For instance, the text modification engine 120 can maintain a substitution mapping for the prompt that indicates the substitutions made to the original prompt. When converting the sanitized response to an un-sanitized response, the text modification engine 120 can use that mapping specific to the original prompt to maintain the original language from the prompt.

The sanitization system 106 can provide the un-sanitized response to the client device 104 from which the sanitization system 106 received the response. For instance, the sanitization system 106 can provide instructions to the client device 104 that cause the client device 104 to present the response on a user interface, e.g., the user interface 200*b*.

In some implementations, the sanitization system 106, e.g., the sanitization model 118 or one of the sensitive domain models 116, can determine a meaning of a phrase in the prompt, e.g., a lexical category of the phrase. Some examples of lexical categories can include noun, verb, adjective, adverb, pronoun, preposition, conjunction, interjection, numeral, article, or determiner.

For example, the use of a phrase can have different meanings within a prompt given the context of the phrase. For a company named "Pink scooters", the phrase "Pink" can be sensitive when referring to the company name, e.g., as a noun, while not sensitive when referring to the color of an object, e.g., "pink candy" or "a pink scooter."

As a result, the sensitive domain models 116 can determine, using the contextual information, the meaning of a phrase in the prompt. The sensitive domain models 116 can use that meaning when determining a likelihood that modification of the phrase will maintain the intent of the phrase.

The text modification engine 120 can use the meaning of a phrase to determine which occurrences of the phrase to replace in the prompt. For instance, when the prompt includes at least two instances of the phrase that have a different meaning, the sanitization system 106 can determine to replace some instances of the phrase with one meaning while determining to skip replacing other instances of the phrase that have another meaning. When the prompt is "can Pink scooters be pink colored?", the text modification engine 120 can replace the first instance of "pink" while leaving the second instance with the original text, e.g., a sanitized prompt of "can [scooter brand] scooters be pink colored?"

The sanitization system 106, e.g., the text modification engine 120 or another component of the sanitization system 106, can determine whether a phrase satisfies at least one of one or more predefined content criteria. The predefined content criteria can indicate that one or more predefined phrases should not be included in sanitized prompts, whether the prompts are potentially sensitive or not. For instance, the predefined content criteria can indicate that profanity or other forms of explicit language should be removed from prompts.

In some implementations, the sanitization system 106 can determine to use the local generative AI subsystem 122 to respond to a prompt. The sanitization system 106 can maintain one or more local response criteria that, when at least one is satisfied, the sanitization system 106 determines to send the prompt to the local generative AI subsystem 122 and to skip providing the prompt to any of the generative AI systems 124.

At least one of the local response criteria can relate to the intent of the phrase. For instance, in response to determining that modification of the prompt will not maintain the intent of the phrase, the sanitization system 106 provides the prompt to the local generative AI subsystem 122. The local generative AI subsystem 122 can be any appropriate type of generative AI model, e.g., an LLM. The local generative AI subsystem 122 might not be as robust as the generative AI systems 124. For instance, the local generative AI subsystem 122 might have fewer parameters, have been trained using less data, or a combination of both, compared to each of the models in the generative AI systems 124.

Some of the local response criteria can relate to data types for the prompt. For example, when the prompt includes code or other confidential data, e.g., other types of internal documents, that likely cannot be sanitized, the sanitization system 106 can determine to provide the prompt and the confidential data to the local generative AI subsystem 122.

The sanitization system 106 might determine that a prompt with a single phrase, e.g., a single word, should not get sanitized. For instance, this can occur since the replacement of the phrase with a different phrase would change the intent of the prompt, a prompt with a single phrase might not include sensitive content, or both. In these examples, the sanitization system 106 can determine, e.g., using the sensitive data detection engine 108, whether the phrase is likely sensitive. If so, the sanitization system 106 provides the prompt with the single sensitive phrase to the local generative AI subsystem 122. If not, the sanitization system 106 provides the prompt with the single phrase to one of the generative AI systems 124.

The enterprise system 102, the sanitization system 106, and each of the generative AI systems 124, e.g., each of the LLMs A-C 126*a-c*, is an example of a system implemented as computer programs on one or more computers in one or more locations, in which the systems, components, and techniques described in this specification are implemented. The client device 104 can include personal computers, mobile communication devices, and other devices that can send and receive data over a network. The network (not shown), such as a local area network ("LAN"), wide area network ("WAN"), the Internet, or a combination thereof, connects the enterprise system 102, e.g., the client device 104, the sanitization system 106, and each of the generative AI systems 124. Each of the systems 102, 106, and 124 can use a single computer or multiple computers operating in conjunction with one another, including, for example, a set of remote computers deployed as a cloud computing service.

The sanitization system 106 can include several different functional components, including the sensitive data detection engine 108, the intent detection engine 110, the domain classification model 112, the sensitivity domain models A-B 116*a-b*, the sanitization model 118, and the text modification engine 120. The sensitive data detection engine 108, the intent detection engine 110, the domain classification model 112, the sensitivity domain models A-B 116*a-b*, the sanitization model 118, the text modification engine 120, or a combination of these, can include one or more data processing apparatuses, can be implemented in code, or a combination of both. For instance, each of the sensitive data detection engine 108, the intent detection engine 110, the domain classification model 112, the sensitivity domain models A-B 116*a-b*, the sanitization model 118, and the text modification engine 120 can include one or more data processors and instructions that cause the one or more data processors to perform the operations discussed herein.

The various functional components of the sanitization system 106 can be installed on one or more computers as separate functional components or as different modules of a same functional component. For example, the components of the sanitization system 106 can be implemented as computer programs installed on one or more computers in one or more locations that are coupled to each through a network. In cloud-based systems for example, these components can be implemented by individual computing nodes of a distributed computing system.

Each of the LLMs A-C 126*a-c* are different LLMs, or other appropriate types of generative AI systems 124. For instance, each of the generative AI systems 124 can be provided by a different entity, or be a different version of the same system, e.g., different versions of a particular LLM.

Although the examples described above refer to replacing a phrase with a replacement phrase, similar examples apply to redacting a phrase from a prompt. For instance, the sanitization system 106 can determine whether complete removal of a phrase from a prompt, without inserting a replacement phrase, will maintain the intent of the prompt. If so, the sanitization system 106 can remove the phrase from the prompt. If not, the sanitization system 106 can replace the phrase with a replacement phrase, or send the prompt to the local generative AI subsystem 122, e.g., when the phrase satisfies a sensitivity criterion.

In some examples, replacing a phrase with a replacement phrase can include rewording the prompt. Rewording a prompt can include rearranging an order of the words in the prompt to reduce a likelihood that the prompt has a sensitive context. One example of rewording a prompt can include changing an original prompt of "My colleague is harassing me. How should I report it to HR?" to the sanitized prompt of "How should an employee report harassment in the workplace?" In these examples, although the prompt might include replacement phrases, the sanitization system 106 can determine to skip un-sanitizing any response received from the generative AI systems 124 since the sanitized prompt does not include any placeholder values represented by replacement phrase in square brackets "[" and "]".

Although the examples in FIGS. 1-2B are described with respect to a prompt, the environment 100 can process other types of messages. For instance, the sanitization system 106 can process emails, text messages, prompts, and other appropriate types of messages. These messages can be messages transmitted from a client device 104 that is managed by the enterprise system 102.

The message can have any appropriate type of intended destination. For instance, an intended destination can be another device for the enterprise system 102. In these examples, the sanitization system 106 can determine to skip processing the message. The intended destination can be an external system, e.g., one of the generative AI systems 124 or another appropriate system. For instance, some other types of external system include external email systems, for accounts not managed by, or otherwise for, the enterprise system 102; a device operated by a person who is not an employee of the enterprise that operates the enterprise system 102; a file server, e.g., not operated by or otherwise for the enterprise system 102; or a combination of two or more of these.

The sanitization system 106 can analyze any attachments included in the message. These attachments can include attachments included in a text message, for an email, or other appropriate types of messages. For instance, the sanitization system 106 can analyze an email and all of its attachments as part of an analysis process. When the sanitization system cannot analyze an attachment, e.g., that is password protected, or determines that the message cannot be sanitized, the sanitization system 106 can block transmission of the message, e.g., instead of providing the message to the local generative AI subsystem 122.

Figure 3:
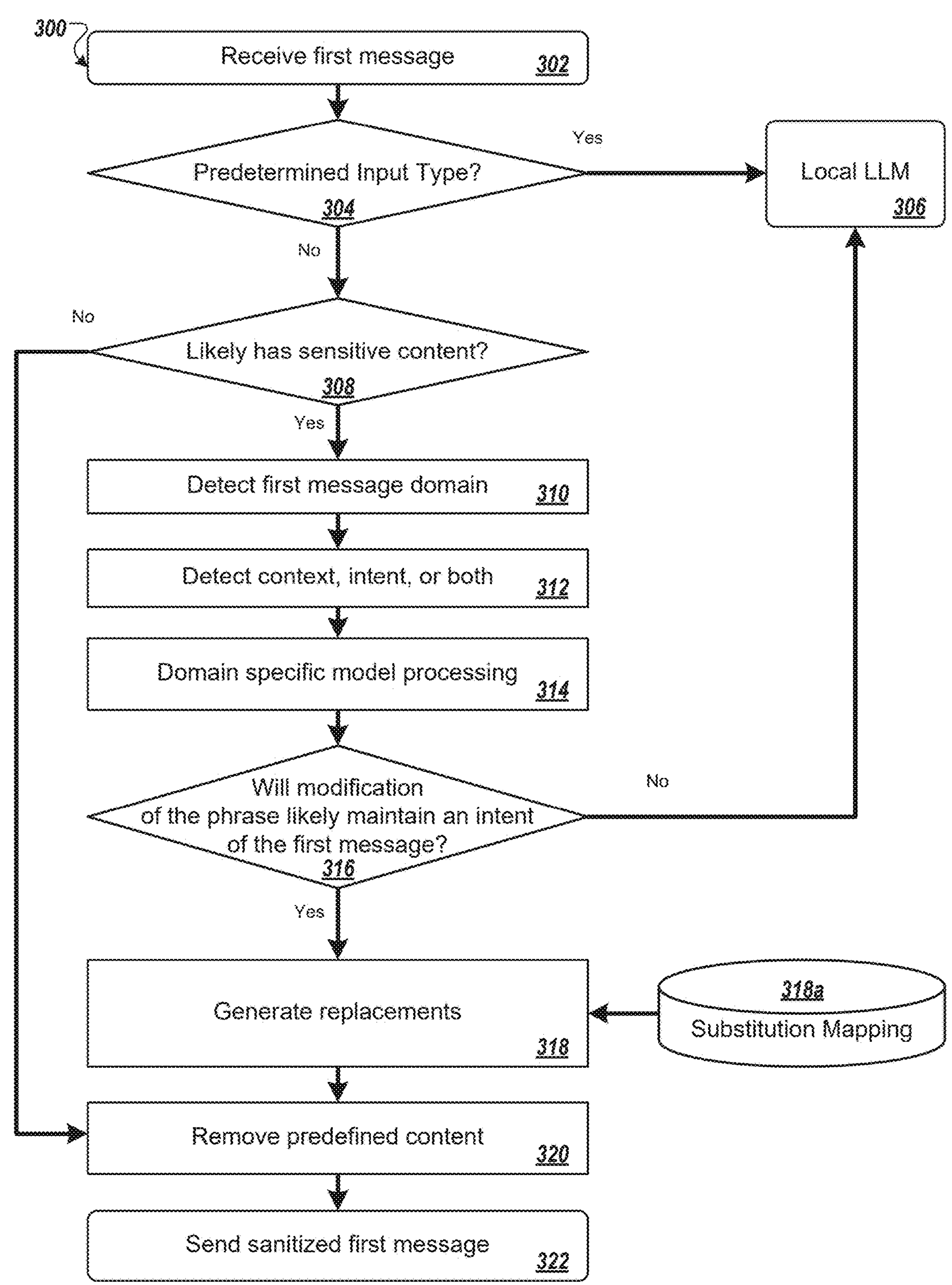
FIG. 3 is a flow diagram of an example process for determining whether to sanitize a prompt.

FIG. 3 is a flow diagram of an example process 300 for determining whether to sanitize a message. For example, the process 300 can be used by the sanitization system 106 from the environment 100.

A sanitization system receives a first message (302). For instance, the sanitization system received the first message from a client device that is part of an enterprise system. To be part of the enterprise system, the client device can be physically located at the enterprise system, be controlled by the enterprise system, e.g., with a mobile device management profile, or otherwise access the sanitization system using data for the enterprise system, e.g., using enterprise credentials.

The first message can have any appropriate type. For instance, the first message can be a prompt, e.g., for a search engine, a generative AI system, or a combination of both; an email; a text message; or a combination of two or more of these.

The sanitization system can determine an intended destination for the first message. For instance, the sanitization system can determine whether the first message is a prompt for a generative AI system, an email for an account managed by the same enterprise system, a text message for an account, e.g., phone number, that is not managed by or otherwise associated with the same enterprise system; or a combination of these.

The sanitization system can determine whether the intended destination is managed by or otherwise associated with the enterprise system. An intended destination can be associated with the enterprise system when a destination device includes a device management profile for the enterprise system, has an identifier, e.g., phone number, for an employee of the enterprise system, or is associated in another appropriate manner.

When the sanitization system determines that the intended destination is associated with the enterprise system, the sanitization can determine to skip analysis of the first message. For instance, the sanitization system can provide the first message to the intended destination. In some instances, the sanitization system can remove predefined content from the message, e.g., perform operation 320, without performing any of operations 304 through 318 from the process 300.

When the sanitization system determines that the intended destination is not associated with the enterprise system, the sanitization system can continue with the process 300. For instance, the sanitization system can perform operation 304.

The sanitization system determines whether an input type of the first message is a predetermined type (304). For instance, the sanitization system can determine whether the first message includes data that does not satisfy one or more sanitization criteria. The sanitization criteria can indicate a likelihood that the first message can be sanitized. For example, the sanitization criteria can indicate that the sanitization system cannot likely sanitize messages with code, documents, or both, and that these messages should be provided to a local generative AI model, e.g., a local LLM, be blocked from transmission to an external system, or a combination of both.

The sanitization system provides data for the first message to the local LLM (306). For instance, in response to determining that the input type of the first message is the predetermined type, the sanitization system provides the first message, a body of the first message, or other appropriate data for the first message to the local LLM. In some instances, the sanitization system can block transmission of the first message, e.g., to a destination outside the enterprise system and the sanitization system.

In some implementations, the determination whether the input type is of the predetermined type can be part of a selection of a generative AI system to which data for the first message should be sent. For example, the sanitization system can select, from a group comprising a local generative artificial intelligence system and at least one external generative artificial intelligence system, the generative artificial intelligence system to which the data, e.g., a second message, should be sent. The local generative artificial intelligence system is not provided a sanitized first message, e.g., a sanitized message, and is a less robust system than any of the external generative artificial intelligence systems. In response to selecting the generative artificial intelligence system, the sanitization system can provide the data, e.g., the second message, to the selected generative artificial intelligence system.

The sanitization system determines whether the first message likely has sensitive content (308). The sanitization system can use any appropriate type of data when making this determination, such as a phrase, e.g., when performing some operations in the process 300 for each phrase, contextual information for the first message, or a combination of both. This determination can include determining, using the phrase, whether the phrase should be analyzed using a sanitization process and the phrase likely includes sensitive data. The sanitization process can include one or more of operations 310, 312, 314, or 316.

The sanitization system detects a domain (310). The domain can be for the entire first message, a phrase in the first message, or a combination of both. When detecting a domain for a phrase in the first message, the sanitization system can perform operation 312 for each of multiple phrases in the first message, e.g., for all phrases or all phrases that have a domain.

The sanitization system detects a context, an intent, or both, for the first message (312). For instance, the sanitization system can determine an intent of the first message using the words of the first message, contextual information for the first message, or a combination of both. The sanitization system can detect the context using data for a session during which the first message was received. In some examples, the sanitization system can determine a context for a phrase in the first message, e.g., when the first message includes multiple phrases. The sanitization system can detect a context for each of multiple phrases in the first message, e.g., all phrases in the first message.

The sanitization system performs domain specific model processing (314). For instance, the domain specific models can perform one or more operations as described throughout this specification. In some examples, at least one of the domain specific models can determine, using the context, an importance of the phrase in the first message. The determination of the importance can include determining, using the context, an importance score that represents the importance of the phrase in the first message.

At least some of the domain specific models can determine a sensitivity for a phrase, e.g., for one phrase or for multiple phrases in the first message. Determining the sensitivity can include a domain specific model for the domain, a sensitivity score that indicates whether the phrase satisfies one or more sensitivity criteria for the domain.

The sanitization system determines whether modification of the phrase will likely maintain an intent of the first message (316). The sanitization system can use one or more of a context of the first message, a context of a phrase, an importance of the phrase, a sensitivity of the phrase, or a combination of two or more of these, when determining whether modification of the phrase will likely maintain the intent of the first message. In some examples, this can include using one or both of the importance score or the sensitivity score.

When the sanitization system determines that modification of the phrase likely will not maintain the intent of the first message, the sanitization system can determine to send the first message to the local LLM. For instance, the sanitization system can proceed to operation 306 for the first message. This can occur when the phrase is for a key entity, e.g., a phrase that has a very high importance score and when substituted or redacted would likely renders the first message useless. The phrase for the key entity can be the name of the key entity without which the intent of the first message would be lost.

The sanitization system generates replacements, e.g., substitutions, for one or more phrases in the first message (318). For instance, in response to determining that modification of the phrase will likely maintain the intent of the first message, the sanitization system can generate a replacement of the phrase. The sanitization system can perform this operation for each of multiple phrases in the first message that are likely sensitive.

In some examples, the sanitization system can generate the replacements using a substitution mapping 318*a*. The substitution mapping can be a cache of entity name to replacement phrases. The sanitization system can use the substitution mapping before prompting a local generative AI model for a substitution. The local generative AI model can be the local LLM used for local response generation or another local model, whether an LLM or otherwise.

The sanitization system can populate the substitution mapping using any appropriate process. For instance, the sanitization system can populate the substitution mapping using data from an enterprise system, e.g., received during an onboarding process. In some examples, the sanitization system can populate the substitution mapping using data from a local generative AI model. The data from the local generative AI model can be data generated specifically for the first message, previously generated by the local generative model, e.g., for replacements with a frequency that satisfies a frequency threshold, or a combination of both. In the latter examples, the sanitization system can determine, for a particular replacement, that the replacement has a frequency that satisfies the frequency threshold. In response, the sanitization system can store the replacement, and the corresponding phrase, in the substitution mapping, e.g., for the corresponding enterprise or for multiple enterprises.

The sanitization system can use the replacements to generate a sanitized first message, e.g., a second message. The sanitized first message can include all the phrases from the original first message but with any occurrences of phrases identified for replacement, replaced by the replacement phrases.

The sanitization system removes predefined content (320). For instance, the sanitization system can remove predefined content such as stop words, profanity, other types of inappropriate phrases or content, or a combination of these. In some examples, the sanitization system might perform operation 320 for only certain types of first messages, or for all first messages. For example, the sanitization system might perform operation 320 for only first messages that do not likely have sensitive content or for first messages that are sent to the local LLM.

The sanitization system sends a sanitized first message (322). For instance, the sanitization system can send the sanitized first message, that includes the replacement phrases, to an external system. The sanitization system can determine the external system using data from the first message that indicates an intended destination for the first message, a selected external generative AI system, or a combination of both. The sanitized first message, e.g., the second message, can be part of a message that does not include any phrases that were identified for replacement, the predefined content, or a combination of both. In some examples, the sanitization system can generate the sanitized first message by replacing at least some instances of the phrase identified for replacement with the replacement phrase.

The order of operations in the process 300 described above is illustrative only, and determining whether to sanitize the message can be performed in different orders. For example, the process 300 can perform operations 310 and 312 in any order, e.g., perform operation 310 after operation 312, or both operations at least partially concurrently. In some examples, the process 300 can perform operation 320 before operation 318, before operation 304, or before any other appropriate operation.

In some implementations, the process 300 can include additional operations, fewer operations, or some of the operations can be divided into multiple operations. For example, the process 300 can include receipt of a sanitized response from the generative AI system to which the sanitized first message was sent. The sanitization system can replace the substitutions from the sanitized response with the original phrases, e.g., using a mapping maintained in memory that is specific to the sanitized first message that was the basis of the sanitized response. This replacement can generate an un-sanitized response. The sanitization system can provide the un-sanitized response to the device from which the original first message was received.

In some implementations, the sanitization model can determine whether to update a response received from an external generative AI system. This determination can be made since some messages might be sent to an external generative AI system without any sanitization, e.g., when operation 308 determines that a first message likely does not have sensitive content. In some examples, the sanitization model can make this determination using a result of the determination whether modification of the phrase will likely maintain the intent of the first message. This can occur when a first message likely has sensitive content, e.g., the first message "what is John Doe's height", but is ultimately determined to not be modified.

The provision of a response, e.g., an un-sanitized response or an unmodified response, to the device that initiated the first message can include providing instructions that cause presentation of data for the response. This provision can use a result of the determination whether to update the response which determination was made using the result of the determination whether modification of the phrase will likely maintain the intent of the first message.

In this specification, the term "database" is used broadly to refer to any collection of data: the data does not need to be structured in any particular way, or structured at all, and it can be stored on storage devices in one or more locations. A database can be implemented on any appropriate type of memory.

In this specification the term "engine" is used broadly to refer to a software-based system, subsystem, or process that is programmed to perform one or more specific functions. Generally, an engine will be implemented as one or more software modules or components, installed on one or more computers in one or more locations. In some instances, one or more computers will be dedicated to a particular engine. In some instances, multiple engines can be installed and running on the same computer or computers.

A number of implementations have been described. Nevertheless, it will be understood that various modifications can be made without departing from the spirit and scope of the disclosure. For example, various forms of the flows shown above can be used, with operations re-ordered, added, or removed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, a data processing apparatus. Alternatively or in addition, the program instructions can be encoded on an artificially-generated propagated signal, e.g., a machine-generated electrical, optical, or electromagnetic signal, that is generated to encode information for transmission to a suitable receiver apparatus for execution by a data processing apparatus. One or more computer storage media can include a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can be or include special purpose logic circuitry, e.g., a field programmable gate array ("FPGA") or an application-specific integrated circuit ("ASIC"). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can be performed by, and apparatus can also be implemented as, special purpose logic circuitry, e.g., a field programmable gate array ("FPGA") or an application-specific integrated circuit ("ASIC").

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. A computer can be embedded in another device, e.g., a mobile telephone, a smart phone, a headset, a personal digital assistant ("PDA"), a mobile audio or video player, a game console, a Global Positioning System ("GPS") receiver, or a portable storage device, e.g., a universal serial bus ("USB") flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a liquid crystal display ("LCD"), an organic light emitting diode ("OLED") or other monitor, for displaying information to the user and a keyboard and a pointing device, e.g., a mouse or a trackball or a touchscreen, by which the user can provide input to the computer. Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input. In some examples, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an Hypertext Markup Language ("HTML") page, to a user device, e.g., for purposes of displaying data to and receiving user input from a user device, which acts as a client. Data generated at the user device, e.g., a result of user interaction with the user device, can be received from the user device at the server.

Figure 4:
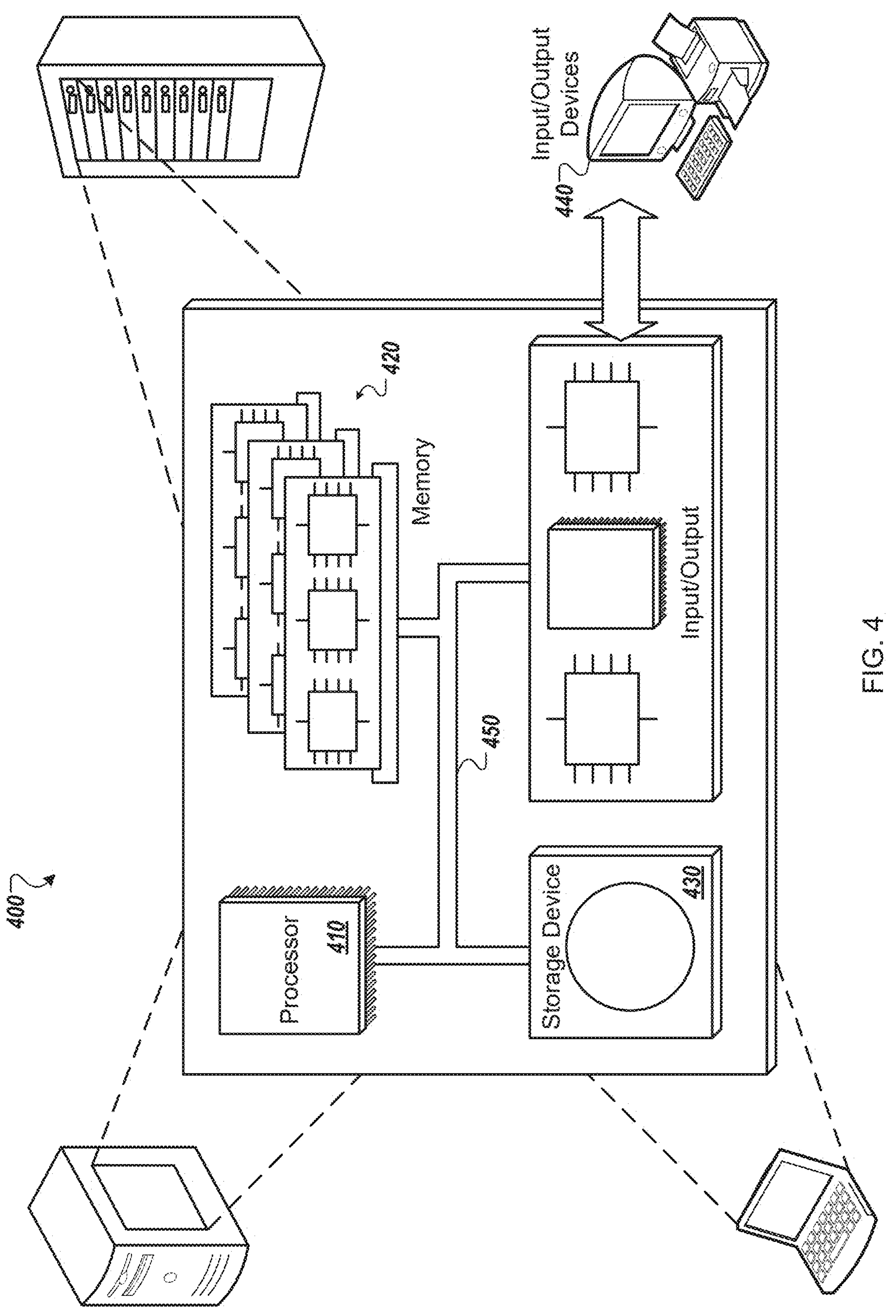
FIG. 4 is a block diagram of a computing system that can be used in connection with computer-implemented methods described in this specification.

An example of one such type of computer is shown in FIG. 4, which shows a schematic diagram of a computer system 400. The computer system 400 can be used for the operations described in association with any of the computer-implemented methods described previously, according to some implementations. The computer system 400 includes a processor 410, a memory 420, a storage device 430, and an input/output device 440. Each of the components 410, 420, 430, and 440 are interconnected using a system bus 450. The processor 410 is capable of processing instructions for execution within the computer system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the computer system 400. In some implementations, the memory 420 is a computer-readable medium. In some implementations, the memory 420 is a volatile memory unit. In some implementations, the memory 420 is a non-volatile memory unit.

The storage device 430 is capable of providing mass storage for the computer system 400. In some implementations, the storage device 430 is a computer-readable medium. In some implementations, the storage device 430 can be a floppy disk device, a hard disk device, an optical disk device, or a tape device.

The input/output device 440 provides input/output operations for the computer system 400. In some implementations, the input/output device 440 includes a keyboard, a pointing device, a touchscreen, or a combination of these. In some implementations, the input/output device 440 includes a display unit for displaying graphical user interfaces. In some implementations, the input/output device 440 includes a microphone, a speaker, or a combination of both.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some instances be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures, such as spreadsheets, relational databases, or structured files, may be used.

Particular implementations of the invention have been described. Other implementations are within the scope of the following claims. For example, the operations recited in the claims, described in the specification, or depicted in the figures can be performed in a different order and still achieve desirable results. In some implementations, multitasking and parallel processing may be advantageous.

What is claimed is:

1. One or more non-transitory computer storage media encoded with instructions that, when executed by one or more computers, cause the one or more computers to perform operations comprising:

receiving a message for an external system;

determining, by a sensitive data detection engine, a prompt context of the message using data from one or more other messages transmitted as part of the same group of messages as the message;

determining, by a sensitive data detection engine and using the prompt context of the message, whether the message likely includes sensitive data;

determining, by the sensitive data detection engine, whether to permit unedited transmission of the message to the external system using a result of the determination whether the message likely includes the sensitive data using the prompt context of the message; and performing one or more actions using a result of the determination whether to permit unedited transmission of the message to the external system.

2. The computer storage media of claim 1, wherein:

determining whether to permit unedited transmission of the message to the external system comprises determining whether to generate a second message for the external system using a result of the determination whether to permit unedited transmission of the message to the external system; and performing one or more actions uses a result of the determination whether to generate the second message for the external system.

3. The computer storage media of claim 2, wherein performing the one or more actions comprises:

generating a second message for the external system using the result of the determination whether to generate a second message for the external system;

providing, to the external system, the second message;

receiving, from the external system, a response;

determining whether to update the response using the result of the determination whether to permit unedited transmission of the message to the external system; and providing instructions that cause presentation of data for the response using a second result of the determination whether to update the response.

4. The computer storage media of claim 2, wherein determining whether to generate a second message for the external system comprises:

determining whether the message can likely be sanitized;

selecting, from a group comprising a local generative artificial intelligence system and at least one external generative artificial intelligence system, a generative artificial intelligence system, the local generative artificial intelligence system not being provided sanitized messages; and in response to selecting the generative artificial intelligence system, providing the second message to the generative artificial intelligence system.

5. The computer storage media of claim 2, the operations comprising:

determining, for a phrase from two or more phrases include in and using a phrase context that indicates a context of the phrase in the message, that modification of the phrase will likely maintain an intent of the message;

generating the second message by replacing one or more instances of the phrase with a replacement phrase;

updating a response received from the external system by replacing instances of the replacement phrase with the phrase; and providing instructions that cause presentation of the response that includes the phrase instead of the replacement phrase.

6. The computer storage media of claim 3, wherein generating the second message for the external system using the result of the determination whether to permit unedited transmission of the message to the external system comprises:

in response to determining that modification of a phrase from the message will likely maintain an intent of the message, providing, to a sanitization model, the phrase as input;

in response to providing the phrase as input, receiving, from the sanitization model, a replacement phrase for the phrase that does not include sensitive data; and generating, using a context, the second message that replaces at least some instances of the phrase with the replacement phrase.

7. The computer storage media of claim 6, wherein providing the phrase as input comprises providing, as input to the sanitization model, the phrase, a sensitivity score for the phrase, and an importance score for the phrase.

8. The computer storage media of claim 1, the operations comprising:

determining a phrase context of a phrase in the message; and determining, by the sensitive data detection engine and using the phrase context of the phrase in the message, a meaning of the phrase, wherein:

determining whether to permit unedited transmission of the message to the external system uses the result of the determination whether the message likely includes the sensitive data using the prompt context of the message and the meaning of the phrase in the message.

9. The computer storage media of claim 1, wherein determining whether to permit unedited transmission of the message to the external system comprises:

determining, using a classification model that receives the message as input, a classification of a phrase from two or more phrases included in the message;

determining, using a model that receives the message as input, whether the phrase satisfies one or more sensitivity criteria for the classification; and determining whether to permit unedited transmission of the message to the external system using the prompt context and a third result of the determination whether the phrase satisfies one or more sensitivity criteria for the classification.

10. The computer storage media of claim 9, wherein determining whether the phrase satisfies the one or more sensitivity criteria comprises determining whether the phrase satisfies one or more of a first sensitive content criterion for the classification or a second sensitive intent criterion for the classification.

11. The computer storage media of claim 9, the operations comprising, for the phrase from the two or more phrases:

determining, using a phrase context for the phrase in the message, an importance of the phrase in the message, wherein:

determining whether to permit unedited transmission of the message to the external system uses the prompt context, the importance of the phrase in the message and the third result of the determination whether the phrase satisfies one or more sensitivity criteria for the classification.

12. The computer storage media of claim 11, comprising:

for each of one or more phrases included in the two or more phrases from the message:

determining, using the phrase context, an importance score that represents the importance of the corresponding phrase in the message; and determining, using the model, a sensitivity score that indicates whether the corresponding phrase satisfies one or more sensitivity criteria for the classification, the importance score being a different score than the sensitivity score, wherein:

determining whether to permit unedited transmission of the message to the external system uses, for each of the one or more phrases, a combination of the importance score and the sensitivity score.

13. The computer storage media of claim 8, the operations comprising, for the phrase from the message:

determining, using the phrase context, an importance of the phrase in the message, wherein:

determining whether to permit unedited transmission of the message to the external system uses the prompt context of the message, the phrase context of the phrase, and the importance of the phrase in the message.

14. The computer storage media of claim 1, the operations comprising:

determining, using a classification or an intent for a phrase from the message and that that was generated using an a computer-implemented artificial intelligence model, whether the phrase should be analyzed using a sanitization process and the phrase likely includes sensitive data; and determining a context for the phrase in the message in response to determining that the phrase should be analyzed using the sanitization process, wherein determining whether the message likely includes sensitive data uses the prompt context and the context for the phrase.

15. The computer storage media of claim 1, wherein performing the one or more actions comprises blocking transmission of the message to the external system.

16. The computer storage media of claim 15, wherein performing the one or more actions comprises blocking transmission of any data for the message to the external system.

17. The computer storage media of claim 1, wherein the message comprises at least one of a prompt, an email, or a text message.

18. The media of claim 1, wherein determining the prompt context of the message uses data from one or more of i) a same chat as the message, or ii) one or more other messages transmitted as part of the same network session as the message.

19. The media of claim 1, wherein the message is sensitive in a first context and is not sensitive in a second, different context.

20. The media of claim 1, wherein the message comprises a phrase that is sensitive in a first context and is not sensitive in a second, different context.

21. A system comprising one or more computers and one or more storage devices on which are stored instructions that are operable, when executed by the one or more computers, to cause the one or more computers to perform operations comprising:

receiving a message for an external system;

determining, by a sensitive data detection engine, a prompt context of the message using data from one or more other messages transmitted as part of the same group of messages as the message;

determining, by a sensitive data detection engine and using the prompt context of the message, whether the message likely includes sensitive data;

determining, by the sensitive data detection engine, whether to permit unedited transmission of the message to the external system using a result of the determination whether the message likely includes the sensitive data using the prompt context of the message; and performing one or more actions using a result of the determination whether to permit unedited transmission of the message to the external system.

22. A computer-implemented method comprising:

receiving a message for an external system;

determining, by a sensitive data detection engine, a prompt context of the message using data from one or more other messages transmitted as part of the same group of messages as the message;

determining, by a sensitive data detection engine and using the prompt context of the message, whether the message likely includes sensitive data;

determining, by the sensitive data detection engine, whether to permit unedited transmission of the message to the external system using a result of the determination whether the message likely includes the sensitive data using the prompt context of the message; and performing one or more actions using a result of the determination whether to permit unedited transmission of the message to the external system.

23. The method of claim 22, comprising:

determining a phrase context of a phrase in the message; and determining, by the sensitive data detection engine and using the phrase context of the phrase in the message, a meaning of the phrase, wherein:

determining whether to permit unedited transmission of the message to the external system uses the result of the determination whether the message likely includes the sensitive data using the prompt context of the message and the meaning of the phrase in the message.

* * * * *